United States Patent
Ge et al.

(10) Patent No.: US 12,375,139 B2
(45) Date of Patent: Jul. 29, 2025

(54) ANTENNA SWITCHING METHOD AND RELATED DEVICE

(71) Applicant: HUAWEI TECHNOLOGIES CO., LTD., Guangdong (CN)

(72) Inventors: Chenhui Ge, Shanghai (CN); Linlin Wang, Xi'an (CN); Liang Li, Shanghai (CN); Haizheng Tang, Shanghai (CN); Jie Lin, Shanghai (CN); Jiachong Zhou, Shanghai (CN); Xiaoguang Sun, Shanghai (CN); Shiguo Guan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 18/312,095

(22) Filed: May 4, 2023

(65) Prior Publication Data
US 2023/0275628 A1  Aug. 31, 2023

Related U.S. Application Data

(63) Continuation of application No. PCT/CN2021/128028, filed on Nov. 2, 2021.

(30) Foreign Application Priority Data

Nov. 5, 2020 (CN) .......................... 202011222914.4

(51) Int. Cl.
*H04L 5/12* (2006.01)
*H04B 7/06* (2006.01)
*H04W 36/08* (2009.01)

(52) U.S. Cl.
CPC ........ *H04B 7/0602* (2013.01); *H04W 36/085* (2023.05)

(58) Field of Classification Search
CPC .. H04B 7/0602; H04B 7/0608; H04B 7/0491; H04B 7/0802; H04B 1/401; H04W 36/085; H04W 88/085
(Continued)

(56) References Cited

U.S. PATENT DOCUMENTS 8,457,687 B2 *  6/2013  Yamaguchi .......... H04B 7/0689
                                                        455/562.1
10,986,032 B2 *  4/2021  Ohta ..................... H04W 76/15
(Continued)

FOREIGN PATENT DOCUMENTS

CN  106656279 A   5/2017
WO  WO-02056500 A1 *  7/2002

OTHER PUBLICATIONS

Extended European Search Report in European Appln No. 21888534.1, dated Mar. 6, 2024, 10 pages.

*Primary Examiner* — Helene E Tayong
(74) *Attorney, Agent, or Firm* — Fish & Richardson P.C.

(57) ABSTRACT

Embodiments of this application provide antenna switching methods and apparatuses. In an implementation, a first communication device determines a first antenna identifier based on air interface transmission information, the first communication device sends the first antenna identifier to a digital switch, and the digital switch switches from a second switch state to a first switch state based on the first antenna identifier, where the first switch state indicates that a second communication device communicates with the first antenna within a first time unit, and the second switch state indicates that the second communication device communicates with a second antenna within a second time unit.

16 Claims, 9 Drawing Sheets

(58) Field of Classification Search
USPC .......................................................... 375/262
See application file for complete search history.

(56) References Cited

U.S. PATENT DOCUMENTS

| | | | |
|---|---|---|---|
| 11,956,054 B2 * | 4/2024 | Zhou | .................... H04B 7/0693 |
| 2013/0053050 A1 | 2/2013 | Kang et al. | |
| 2013/0172050 A1 | 7/2013 | Fleming et al. | |

* cited by examiner

ANTENNA SWITCHING METHOD AND RELATED DEVICE

CROSS-REFERENCE TO RELATED APPLICATIONS

This application is a continuation of International Application No. PCT/CN2021/128028, filed on Nov. 2, 2021, which claims priority to Chinese Patent Application No. 202011222914.4, filed on Nov. 5, 2020. The disclosures of the aforementioned applications are hereby incorporated by reference in their entireties.

TECHNICAL FIELD

Embodiments of this application relate to the communication field, and in particular, to an antenna switching method.

BACKGROUND

Mobile communication networks are of great value and significance to meet people's needs and promote local economic and social development. In a current mobile communication network system, a base station system mainly includes a baseband unit (BBU), a remote radio unit (RRU), and an antenna. The BBU is mainly responsible for baseband processing of a signal, the RRU is mainly responsible for radio frequency processing, and the antenna is mainly responsible for radiation and reception of a radio wave.

Currently, a coverage rate of a mobile communication network does not reach 100%, especially in areas such as remote mountain tourist areas, remote highways, forests, ranches, and small farms. In these areas, although a plurality of antennas can implement mobile network coverage in a larger range, because these areas are sparsely populated and have extremely low traffic, only one of the plurality of antennas of a base station system needs to send or receive data at many moments.

In the current technology, a single RRU can only support a single antenna, and each antenna corresponds to a sector. If signal coverage of a sector is ensured, a specific quantity of antennas needs to be added. This also increases a quantity of RRU devices accordingly. It is clearly that if signals in remote areas with extremely low traffic can be covered, directional coverage of a single base station in a plurality of sectors causes an increase in costs of the RRU device, and because of extremely low traffic, the RRU device is often in an idle state, causing a waste of RRU device resources.

SUMMARY

A first aspect of embodiments of this application provides an antenna switching method. The method in embodiments of this application may be implemented by a first communication device, or may be implemented by a chip or a processor in the first communication device. The first communication device is used as an example for description in embodiments of this application, and the method includes the following:

the first communication device determines a first antenna identifier based on air interface transmission information, where the first antenna identifier corresponds to a first switch state, and the first switch state indicates that a digital switch connects a second communication device and a first antenna within a first time unit.

Therefore, in the first switch state, the second communication device may communicate with the first antenna.

The first communication device sends the first antenna identifier to the digital switch. The first antenna identifier indicates the digital switch to switch from a second switch state to the first switch state. The second switch state indicates that the second communication device is connected to a second antenna within a second time unit, the second communication device may communicate with the second antenna in the second switch state, the second communication device is configured to process a signal of the first communication device, and the first time unit appears after the second time unit.

In embodiments of this application, the digital switch switches a channel of the second communication device (for example, a remote radio unit) from the second antenna to the first antenna based on the first antenna identifier sent by the first communication device. In this way, a plurality of antennas may be switched on a channel of a single second communication device. In a case of same signal coverage, a quantity of second communication devices is reduced, thereby effectively reducing costs of the second communication device and improving resource utilization of the second communication device.

In a possible implementation, after the first communication device sends the first antenna identifier to the digital switch, a control module of the first communication device sends sector information corresponding to the first antenna identifier to a baseband module of the first communication device, where the sector information includes a sector number, and a correspondence exists between the sector number and an antenna number.

The baseband module of the first communication device sends service data to the antenna corresponding to the sector information, or the baseband module of the first communication device receives service data received by an antenna corresponding to the sector information.

In embodiments of this application, the control module of the first communication device sends the sector information corresponding to an antenna connected to the digital switch to the baseband module of the first communication device, so that the baseband module of the first communication device transmits uplink or downlink service data, and the control module of the first communication device sends the sector information to the baseband module of the first communication device. The antenna switching solution can be more implementable.

In a possible implementation, the time unit includes a symbol, a slot, a sub-frame, a frame, or a transmission time interval TTI.

In embodiments of this application, a symbol is a basic time unit for signal modulation in a 5th-generation mobile communication technology new radio (NR) network and a 4th-generation mobile communication technology long term evolution (LTE) system. In an NR network, a slot is used as a minimum time unit for data scheduling. In a LTE network, a sub-frame is used as a minimum time unit for data scheduling. Embodiments of this application may be applied to a plurality of mobile communication network systems, which improves applicability of the solution.

In a possible implementation, in a 5th-generation mobile communication NR network, before the first communication device determines the first antenna identifier based on the air interface transmission information, the first communication device forms a plurality of sectors in the first network device into a cell, and the first communication device allocates a synchronization signal and physical broadcast channel block SSB to each sector in the cell. Each sector corresponds to one antenna number, and the cell includes a sector corresponding to the first antenna and a sector corresponding to the second antenna. When the air interface transmission information is service data of the SSB, the first communication device uses at least one of an SSB number, a sector number corresponding to the SSB number, or an antenna number corresponding to the SSB as the first antenna identifier.

In embodiments of this application, the first communication device forms a plurality of sectors into a same cell, and separately allocates an SSB to a sector corresponding to each antenna. When each antenna needs to send a symbol of the SSB, a channel of the second communication device is switched to a corresponding antenna. In embodiments of this application, a single second communication device can simultaneously support normal operation of a plurality of sectors, which improves utilization of the second communication device.

In a possible implementation, when the first communication device determines the first antenna identifier based on the air interface transmission information, if the air interface transmission information is service data of a single sector, the first communication device uses a sector number of the single sector or an antenna number corresponding to the single sector as the first antenna identifier.

In a possible implementation, when the first communication device determines the first antenna identifier within the first time unit based on the air interface transmission information, if the air interface transmission information is service data of a plurality of sectors, the first communication device determines a sector number based on priorities of the service data of the plurality of sectors, and the first communication device uses the sector number or an antenna number corresponding to the sector number as the first antenna identifier.

In embodiments of this application, when the air interface transmission information is service data of a plurality of sectors, the first communication device determines the first antenna identifier based on priorities of the service data in the plurality of sectors, which maximizes transmission value of a first network device system.

In a possible implementation, when the first communication device determines the first antenna identifier based on the air interface transmission information, if the air interface transmission information does not include service data, the first communication device uses any antenna number in an antenna number set or a sector number corresponding to the antenna number as the first antenna identifier, where the antenna number set includes numbers corresponding to K antennas, and K is an integer greater than or equal to 2.

In embodiments of this application, when the air interface transmission information does not include service data that is to be transmitted, the first communication device uses any one in the antenna number set as the first antenna identifier. Specifically, the first communication device may use an antenna number in a previous time unit as the first antenna identifier. When the first communication device uses the antenna number in the previous time unit as the first antenna identifier, the control module of the first communication device may not execute any instruction, which further reduces power consumption of the first network device system.

A second aspect of embodiments of this application provides an antenna switching method, including the following:

A digital switch receives a first antenna identifier sent by a first communication device, where the first antenna identifier may be at least one of an antenna number of a first antenna, a sector number corresponding to the first antenna, or an SSB number corresponding to the first antenna.

The first antenna identifier corresponds to a first switch state, and the first switch state indicates that a second communication device communicates with the first antenna within a first time unit. That the first antenna identifier corresponds to a first switch state may be understood as that, it may be determined, based on the first antenna identifier, that the first antenna corresponding to the first antenna identifier communicates with the second communication device.

The digital switch switches from a second switch state to the first switch state based on the first antenna identifier, and the second switch state indicates that the second communication device communicates with a second antenna within a second time unit, and the first time unit appears after the second time unit.

In embodiments of this application, the digital switch may perform antenna switching based on the first antenna identifier sent by the first communication device, so that time division multiplexing is implemented between a plurality of antennas of a second communication device, and a second communication device can support a plurality of sectors, which improves utilization of the second communication device, reduces a quantity of second communication devices, and reduces costs of a first network device system.

In a possible implementation, the digital switch includes at least one handover switch, a quantity of handover switches is greater than or equal to a quantity of channels of the second communication device. The digital switch receives, through the handover switch, the antenna identifier sent by the first communication device, where different handover switches in the digital switch may receive same or different antenna identifiers, and each handover switch in the digital switch independently performs antenna switching based on the received antenna identifier.

A third aspect of embodiments of this application provides a first communication device, including a determining unit and a sending unit.

The determining unit is configured to determine a first antenna identifier based on air interface transmission information, where the first antenna identifier corresponds to a first switch state, and the first switch state indicates that a second communication device communicates with the first antenna within a first time unit.

The sending unit is configured to send a first antenna identifier to a digital switch, where the first antenna identifier is used by the digital switch to switch from a second switch state to a first switch state, the second switch state indicates that the second communication device communicates with a second antenna within a second time unit, and the first time unit appears after the second time unit.

In a possible implementation, the sending unit is further configured to send sector information corresponding to the first antenna identifier to a baseband module of the first communication device.

The sending unit is further configured to send service data to the antenna corresponding to the sector information, or receive service data received by the antenna corresponding to the sector information.

In a possible implementation, the determining unit is further configured to form a plurality of sectors in the first network device into a cell, and allocate an independent synchronization signal and physical broadcast channel block SSB to each sector in the cell, where each sector corresponds to an antenna number, and the cell includes a sector corresponding to the first antenna and a sector corresponding to a second antenna.

In a possible implementation, the determining unit is specifically configured to, when the air interface transmission information is service data of the SSB, use an SSB number, a sector number corresponding to the SSB, or an antenna number corresponding to the SSB as the first antenna identifier.

In a possible implementation, the determining unit is specifically configured to, if the air interface transmission information is service data of a single sector, use a sector number of the single sector or an antenna number corresponding to the single sector as the first antenna identifier.

In a possible implementation, the determining unit is specifically configured to, if the air interface transmission information is service data of a plurality of sectors, determine a sector number based on priorities of the service data of the plurality of sectors, and use the sector number or an antenna number corresponding to the sector number as the first antenna identifier.

In a possible implementation, the determining unit is specifically configured to, if the air interface transmission information does not include service data, use any antenna number in an antenna number set or a sector number corresponding to the antenna number as the first antenna identifier, where the antenna number set includes numbers corresponding to K antennas, and K is an integer greater than or equal to 2.

A fourth aspect of embodiments of this application provides a digital switch, including a receiving unit and a processing unit.

The receiving unit is configured to receive a first antenna identifier sent by a first communication device, where the first antenna identifier corresponds to a first switch state, and the first switch state indicates that a second communication device communicates with the first antenna within a first time unit.

The processing unit is configured to switch from a second switch state to a first switch state based on the first antenna identifier, where the second switch state indicates that the second communication device communicates with a second antenna within a second time unit, and the first time unit appears after the second time unit. In a possible implementation, the digital switch includes at least one handover switch, a quantity of the handover switches is greater than or equal to a quantity of channels of the second communication device. The receiving unit is specifically configured to receive, through the handover switch, the first antenna identifier sent by the first communication device. The processing unit is specifically configured to switch, through the handover switch, the second switch state to the first switch state based on the first antenna identifier.

A fifth aspect of embodiments of this application provides a first communication device, including a processor and a communication interface. The processor is configured to execute instructions, so that the first communication device performs the method provided in the first aspect or any optional manner of the first aspect. The communication interface is configured to receive or send a packet. For specific details of the first communication device provided in the fifth aspect, refer to the first aspect or any optional manners of the first aspect. Details are not described herein again.

A sixth aspect of embodiments of this application provides a digital switch, including a processor and a communication interface. The processor is configured to execute instructions, so that the digital switch performs the method provided in the second aspect or any optional manner of the second aspect. The communication interface is configured to receive or send a packet.

The digital switch provided in the sixth aspect includes at least one handover switch. The handover switch is configured to switch a second antenna channel to a first antenna channel based on the first antenna identifier, and a quantity of handover switches is greater than or equal to a quantity of channels of the second communication device. For specific details of the digital switch provided in the sixth aspect, refer to the second aspect or any optional manner of the second aspect. Details are not described herein again.

A seventh aspect of embodiments of this application provides an antenna. The antenna includes the digital switch according to the fourth aspect or the digital switch according to the sixth aspect.

An eighth aspect of embodiments of this application provides a second communication device. The second communication device includes the digital switch according to the fourth aspect or the digital switch according to the sixth aspect.

A ninth aspect of embodiments of this application provides a first network device system. The first network device system includes the first communication device according to the third aspect, the first communication device according to the fifth aspect, the digital switch according to the fourth aspect, or the digital switch according to the sixth aspect.

For specific details of the first communication device in the first network device system, refer to the first aspect or any optional manner of the first aspect. Details are not described herein again.

For specific details of the digital switch in the first network device system, refer to the second aspect or any optional manner of the second aspect. Details are not described herein again.

A tenth aspect of embodiments of this application provides a computer-readable storage medium. The computer-readable storage medium stores a program, and when a computer executes the program, the method provided in the first aspect or any optional manner of the first aspect is performed.

An eleventh aspect of embodiments of this application provides a computer-readable storage medium. The computer-readable storage medium stores a program, and when a computer executes the program, the method provided in the second aspect or any optional manner of the second aspect is performed.

A twelfth aspect of embodiments of this application provides a computer program product. When the computer program product is executed on a computer, the computer performs the method provided in the first aspect or any optional manner of the first aspect.

A thirteenth aspect of embodiments of this application provides a computer program product. When the computer program product is executed on a computer, the computer performs the method provided in the second aspect or any optional manner of the second aspect.

A fourteenth aspect of embodiments of this application provides a chip. The chip, when running on a device, causes the device to perform the method provided in the first aspect or any optional manner of the first aspect.

A fifteenth aspect of embodiments of this application provides a chip. The chip, when running on a device, causes the device to perform the method provided in the second aspect or any optional manner of the second aspect.

DESCRIPTION OF EMBODIMENTS

Figure 1:
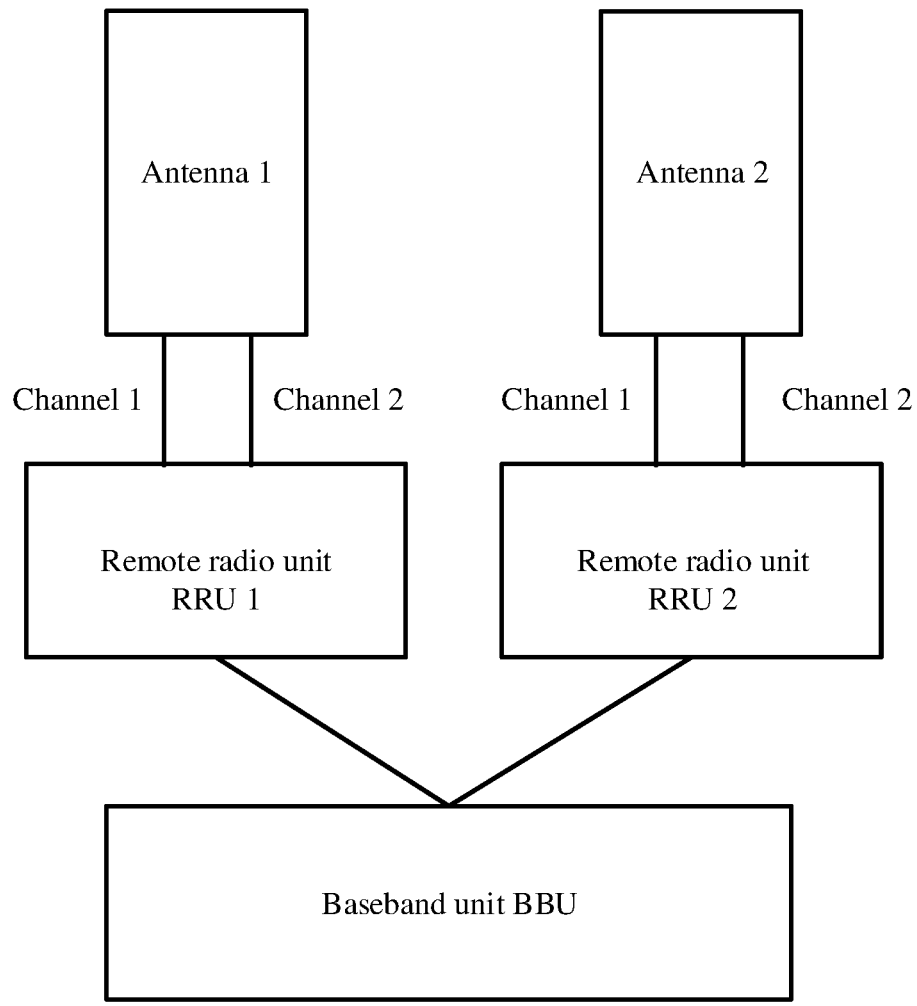
FIG. 1 is a schematic diagram of a structure of a base station system according to an embodiment of this application.

The following clearly and completely describes the technical solutions in embodiments of this application with reference to the accompanying drawings in embodiments of this application. It is clear that the described embodiments are merely some but not all of embodiments of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of this application described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In addition, in embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner.

In the following, some terms in this application are described, to help a person skilled in the art have a better understanding:

A base station, also referred to as a base transceiver station, is configured to transmit a service and signaling through an air interface, and is a part of a network for accessing a terminal to a wireless network. A typical base station generally includes three parts: a baseband unit BBU, a remote radio unit RRU, and an antenna.

The baseband unit (BBU) is a part of a distributed base station, mainly performs baseband processing on signals, and provides transmission management and interfaces, manages radio resources, provides clock signals, and other functions. The baseband processing includes channel coding/decoding, modulation/demodulation, and the like.

The remote radio unit (RRU) is a component of the distributed base station, mainly performs wireless processing on signals, including intermediate frequency processing, radio frequency processing, duplexing, and the like. The intermediate frequency processing includes digital in-phase/quadrature (I/Q) modulation and demodulation, up-conversion and down-conversion, and digital-to-analog/analog-to-digital (DA/AD) conversion.

The antenna is an electromagnetic energy conversion apparatus. The basic functions of the antenna are to radiate and receive radio waves. When transmitting, high-frequency current is converted into electromagnetic wave. When receiving, electromagnetic wave is converted into high-frequency current.

A sector is a space region. A region covered by each antenna is a sector.

A cell is a radio coverage region identified using base transceiver station identity code or a cell global identification.

Refer to FIG. 1, FIG. 1 shows a structure of a typical base station system, including a baseband unit BBU, a remote radio unit RRU, and an antenna. In FIG. 1, the baseband unit BBU is connected to an RRU 1 and an RRU 2, two transmission channels exist between the RRU 1 and an antenna 1, a channel 1 and a channel 2, and two transmission channels also exist between an RRU 2 and an antenna 2.

It may be understood that, in this embodiment of this application, one BBU may be connected to at least two RRUs, each RRU corresponds to one antenna, a channel port of each RRU is connected to an antenna port, and there may be a plurality of channels between the RRU and the antenna.

Figure 2:
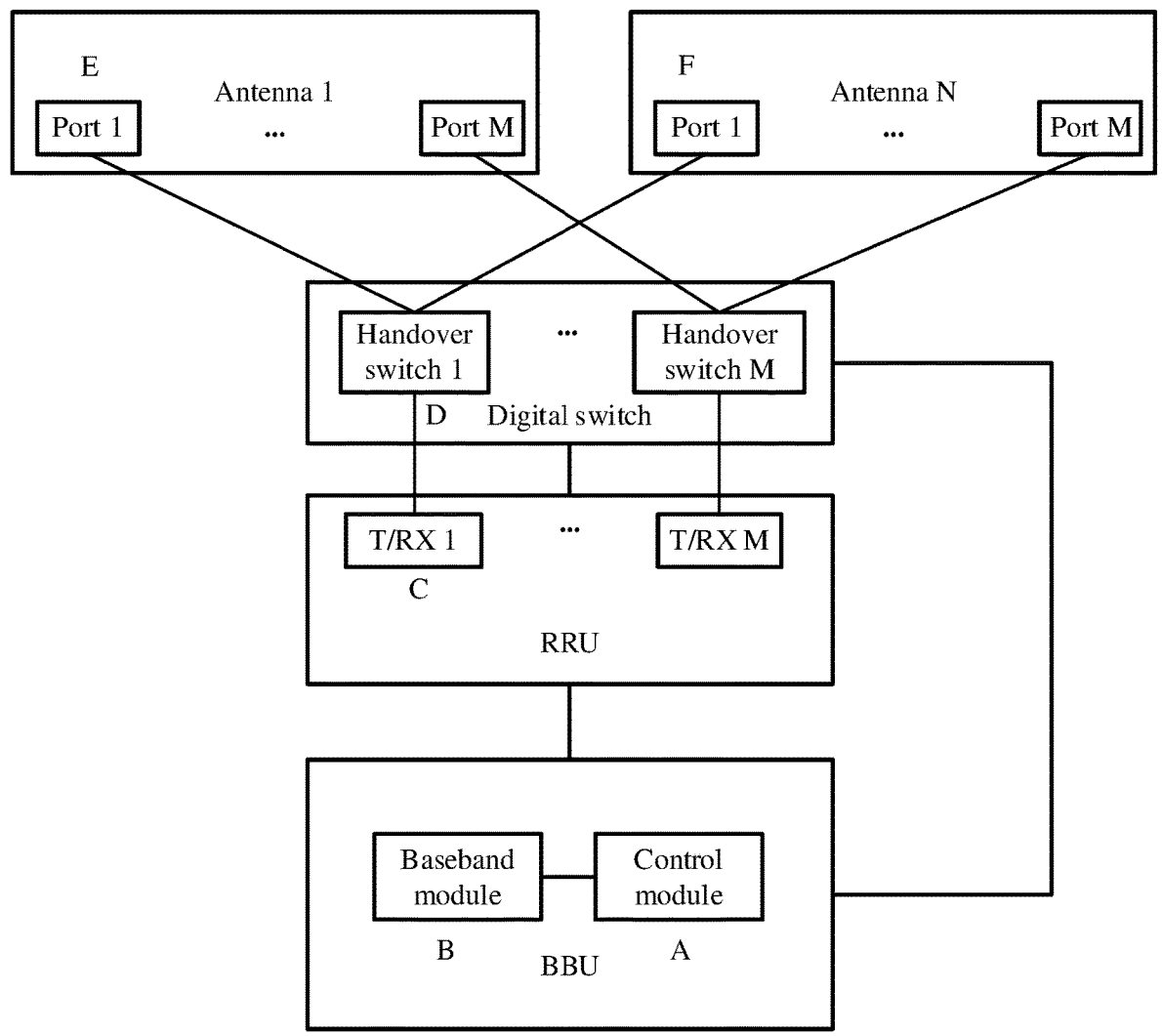
FIG. 2 is a schematic diagram of another base station system according to an embodiment of this application.

The base station system in embodiments of this application includes four parts: a BBU, an RRU, a digital switch, and an antenna. The following describes the base station system in embodiments of this application:

Refer to FIG. 2, FIG. 2 shows a base station system according to an embodiment of this application. The base station system includes a BBU, a RRU, a digital switch, and N antennas, where the RRU is simultaneously connected to the N antennas through the digital switch, and each antenna is responsible for covering one sector.

In FIG. 2, the RRU has M channels. "T/RX 1" is the first channel port of the RRU, and "T/RX M" is the $M^{th}$ channel port of the RRU. The antenna has M ports, and the digital switch integrates M handover switches, where each handover switch uses a 1-to-N connection relationship, and the $k^{th}$ handover switch is responsible for connecting the $k^{th}$ channel in the RRU and the $k^{th}$ port from the antenna 1 to the antenna N. At any moment, the $k^{th}$ handover switch allows only the $k^{th}$ channel in the RRU to be in a valid connected state with the $k^{th}$ port of an antenna, and the $k^{th}$ channel and the $k^{th}$ port of another antenna are in a disconnected state, where 1≤k≤M.

In this embodiment of this application, the digital switch includes at least one handover switch. In each handover switch, an on-off state between the RRU channel and each antenna port is controlled by the handover switch, and the handover switch performs antenna switching based on an identifier sent by a control module of the BBU. The control module of the BBU determines the identifier based on the air interface transmission information.

The RRU channel and each antenna are switched through a handover switch in the digital switch. Each channel of the RRU corresponds to a handover switch in the digital switch. A switch state of each handover switch is independently controlled by the control module of the BBU, and may be the same or may be different. This is not specifically limited herein.

For example, in the same time unit, a "T/RX 1" channel in the RRU is connected to a port 1 in the antenna 1 through a handover switch 1 in the digital switch, and a "T/RX 2" channel in the RRU is connected to a port 2 in an antenna 2 through a handover switch 2 in the digital switch. In this case, the handover switch 1 and the handover switch 2 in the digital switch are connected to different antennas.

Figure 3:
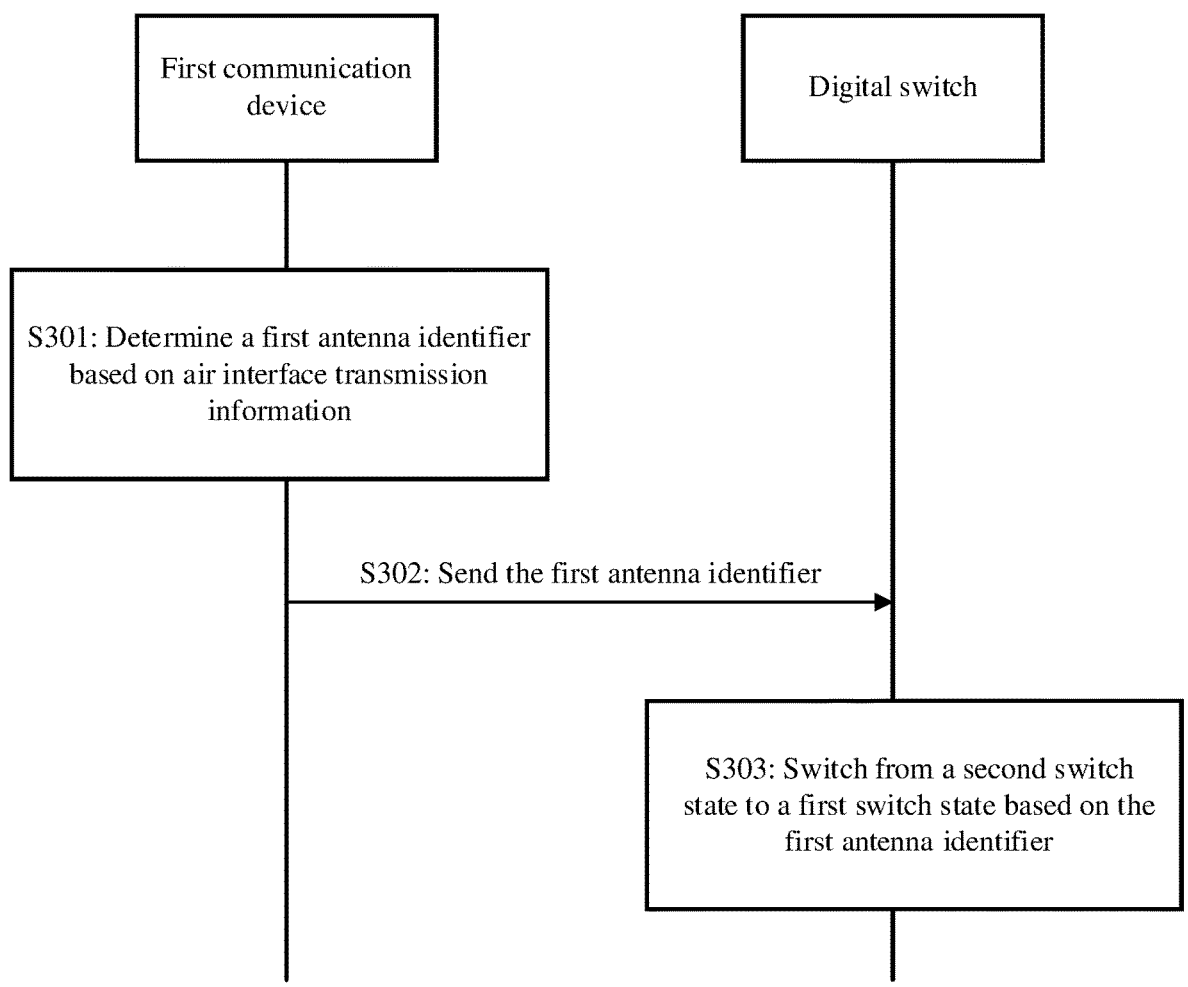
FIG. 3 is a schematic diagram of an antenna switching method according to an embodiment of this application.

Refer to FIG. 3, a procedure of an antenna switching method according to an embodiment of this application includes the following steps.

S301: A first communication device determines a first antenna identifier based on air interface transmission information.

The first communication device in embodiments of this application may be a plurality of types of communication devices, for example, may be a BBU, or may be a physical layer processing module of an active antenna unit (AAU). This is not specifically limited herein.

A second communication device in embodiments of this application may be a plurality of types of communication devices, for example, may be an RRU, or may be some modules of an AAU. This is not specifically limited herein.

The following describes an antenna switching method provided in this embodiment of this application using a baseband unit BBU as a first communication device, a remote radio unit RRU as a second communication device, and a base station including the BBU, a digital switch, and the RRU as a first network device. The BBU determines the first antenna identifier based on the air interface transmission information, where the first antenna identifier corresponds to a first switch state, and the first switch state indicates that the RRU communicates with a first antenna within a first time unit.

There are a plurality of cases in which the BBU determines the first antenna identifier based on the air interface transmission information. The following separately describes the cases:

1. The BBU uses an antenna number or a sector number as the first antenna identifier.

In an example, the BBU scans all sectors with to-be-sent or to-be-received data within a time unit, and then determines a sector as a sector to be connected within the time unit using a time division multiplexing algorithm. The BBU uses a sector number of the sector or an antenna number corresponding to the sector as the first antenna identifier. In this case, the first switch state indicates that the RRU is connected to the antenna corresponding to the sector within the time unit, and the RRU can communicate with the antenna corresponding to the sector. In another example, the control module in the baseband unit BBU scans a sector number corresponding to service data to be received or sent within the first time unit, and then determines a sector number using a time division multiplexing algorithm. An antenna corresponding to the sector number is an antenna to be connected to the RRU within a first time unit. The BBU determines the antenna number of the antenna as the first antenna identifier. In this case, the first switch state indicates that the RRU is connected to the antenna within the time unit, and the RRU may communicate with the antenna corresponding to the sector.

In another example, the control module in the baseband unit BBU scans the sector number corresponding to the service data to be received or sent within the first time unit, and then determines a sector number using a time division multiplexing algorithm. The BBU determines the sector number as the first antenna identifier. In this case, the first switch state indicates that the RRU is connected to the antenna corresponding to the sector determined using a time division multiplexing algorithm within the time unit, and the RRU may communicate with the antenna corresponding to the sector.

The time division multiplexing algorithm in embodiments of this application includes the following cases, which are separately described below.

If the air interface transmission information within a time unit is service data of a single sector, that is, the service data that the BBU needs to send or receive within the time unit is service data of the single sector, the BBU uses a sector number of the sector as the first antenna identifier, or the BBU uses an antenna number corresponding to the sector as the first antenna identifier.

If the air interface transmission information within a time unit is service data of a plurality of sectors, that is, the service data that the BBU needs to send or receive is service data of a plurality of sectors, the BBU needs to determine the first antenna identifier based on priorities of the service data of the plurality of sectors. Specifically, the control module of the BBU may use a sector in which service data with a highest service priority in the service data of the plurality of sectors is located as the sector to which the RRU is to be connected within the time unit, and the BBU uses a sector number of the sector as the first antenna identifier, or the BBU uses an antenna number corresponding to the sector as the first antenna identifier.

In embodiments of this application, the BBU may select a corresponding sector number as a target sector number based on a priority of service data that needs to be sent or received, so that the BBU controls an RRU device resource to be allocated to an antenna corresponding to service data with a high priority, which maximizes value of an RRU device in a base station system and improves efficiency of the base station system.

If the air interface transmission information within a time unit is blank information, that is, the BBU does not have service data that needs to be sent or to be received, the BBU selects any antenna number in all antenna numbers in an antenna set and a sector number corresponding to the any antenna number as the first antenna identifier.

In this embodiment of this application, if the BBU does not have service data that needs to be sent within the first time unit, the BBU uses any one in the antenna number sets as the first antenna identifier. For example, the BBU may use an antenna number in a previous time unit as the first antenna identifier. When the BBU uses the antenna number in the previous time unit as the first antenna identifier, the control module of the BBU may not execute any instruction, which further reduces power consumption of the base station system.

2. The BBU uses an SSB number, an antenna number, or a sector number as the first antenna identifier.

In a new radio (NR) network, before the BBU determines the first antenna identifier based on the air interface transmission information, the BBU forms a plurality of sectors in the base station into a cell, and the BBU allocates an independent synchronization signal and physical broadcast channel block (SSB) to each sector in the cell, where each sector corresponds to an antenna number, and the cell includes a sector corresponding to a first antenna and a sector corresponding to a second antenna. The BBU determines the first antenna identifier based on the air interface transmission information. When the air interface transmission information is service data of the SSB, the BBU uses at least one of the SSB number, the antenna number corresponding to the SSB, or the sector number corresponding to the SSB as the first antenna identifier.

In an example, the BBU forms a plurality of sectors in the base station into a cell. The cell includes a sector corresponding to the first antenna and a sector corresponding to the second antenna. The BBU allocates an independent SSB to each sector, and each sector corresponds to an antenna number. Because there is a correspondence among an SSB number, a sector number, and an antenna number, air interface transmission information may be service data of a single SSB, or may be service data of a plurality of SSBs, or may be blank information indicating that no service data exists. This is not specifically limited herein.

Refer to Table 1, Table 1 shows a correspondence among an antenna number, a sector number, and an SSB number after the BBU allocates an SSB to a sector. For example, the SSB 0 corresponds to a sector number 1, and corresponds to an antenna number 1.

TABLE 1

| Antenna number | Sector number | SSB number |
|---|---|---|
| 1 | 1 | SSB 0 |
| 2 | 2 | SSB 1 |
| ... | ... | ... |
| N | N | SSB (N-1) |

If the air interface transmission information is service data of an SSB, the BBU determines, as the first antenna identifier according to a time division multiplexing algorithm, an SSB number corresponding to the service data of the SSB, a sector number corresponding to the SSB, or an antenna number corresponding to the SSB. Specifically, a process in which the BBU determines the first antenna identifier using the time division multiplexing algorithm is similar to a process in which the first antenna identifier is determined when the air interface transmission information is service data of a sector, and details are not described herein again.

According to the antenna switching method provided in this embodiment of this application, sectors corresponding to a plurality of antennas are combined into a cell, and an SSB is allocated to a sector corresponding to each antenna. A cell includes a plurality of sectors, and each sector corresponds to an antenna. Compared with a single-sector mode corresponding to a single cell, in the antenna switching method provided in this embodiment of this application, time division multiplexing is performed on a plurality of antennas in a single cell, which implements more flexible cell coverage.

In embodiments of this application, the first antenna identifier may indicate a digital switch to switch connections between an RRU and different antennas. The first antenna identifier may be an antenna number of the antenna, or may be a sector number corresponding to the antenna or an SSB number corresponding to the antenna. This is not specifically limited herein.

In embodiments of this application, the air interface transmission information includes to-be-sent or to-be-received data within the time unit. The air interface transmission information may be service data of a single sector, or may be service data of a plurality of sectors, or may be blank information indicating that no service data exists. This is not specifically limited herein.

In embodiments of this application, the BBU may also generate the first antenna identifier based on the air interface transmission information. Specifically, the BBU scans to-be-sent or to-be-received service data within a time unit, and the BBU generates a sector number or an antenna number based on a sector in which the to-be-sent or to-be-received service data is located in the time unit, and uses the sector number or the antenna number as the first antenna identifier. The sector number or the antenna number corresponds to the sector in which the to-be-sent or to-received service data is located within the time unit.

S302: The first communication device sends a first antenna identifier to a digital switch; and the BBU sends the first antenna identifier to the digital switch. The first antenna identifier indicates the digital switch to switch from a second switch state to a first switch state, and the second switch state indicates that the RRU communicates with the second antenna within a second time unit.

The digital switch includes at least one handover switch, a quantity of the handover switches is greater than or equal to a quantity of channels of the RRU, the digital switch receives, through the handover switch, the first antenna identifier sent by the BBU, and the digital switch switches from the second switch state to the first switch state based on the first antenna identifier through the handover switch.

That the BBU sends the first antenna identifier to the digital switch includes the following various examples:

In an example, the control module of the BBU sends the first antenna identifier to the handover switch corresponding to the first antenna identifier in the digital switch. Because each handover switch in the digital switch corresponds to an antenna identifier, different handover switches may be controlled independently or cooperatively, which is not specifically limited herein. In each time unit, states of different handover switches may be the same or may be different.

It may be understood that, if a single antenna identifier corresponds to a single transmit and receive channel of the RRU and a transmit and receive channel of a single antenna, the control module of the BBU implements independent control on the handover switch in the digital switch. If a single antenna identifier corresponds to a plurality of transmit and receive channels of the RRU and transmit and receive channels of a plurality of antennas, the control module of the BBU implements cooperative control on the handover switch in the digital switch.

In another example, the control module of the BBU may directly send the first antenna identifier to the digital switch, or may send the first antenna identifier to the digital switch through the RRU. This is not specifically limited herein.

It may be understood that the BBU may send the first antenna identifier to the digital switch through a separate digital switch control channel, or may send the first antenna identifier to the digital switch through a transmit and receive channel between the RRU and the digital switch in a current time unit. This is not specifically limited herein.

After the control module of the BBU sends the first antenna identifier to the digital switch, the control module of the BBU sends sector information corresponding to the first antenna identifier to a baseband module of the BBU, which is described below with reference to FIG. 2.

In an example, after the control module of the BBU sends the first antenna identifier to the digital switch, the control module of the BBU sends the sector number corresponding to the first antenna identifier to the baseband module of the BBU, where a transmission direction of the sector number is from a control module A of the BBU to a baseband module B of the BBU.

In embodiments of this application, the sector information includes a sector number, an antenna number, and an SSB number. The baseband module of the BBU transmits service data to an antenna corresponding to the first antenna identifier, where the service data includes uplink data and downlink data.

The baseband module of the BBU sends service data to an antenna corresponding to the sector information; or the baseband module of the BBU receives service data received by an antenna corresponding to the sector information. Descriptions are provided below with reference to FIG. 2.

Refer to FIG. 2, after a baseband unit of the BBU obtains the sector number, the baseband module of the BBU may transmit uplink data with the antenna corresponding to the sector number. A transmission direction of the uplink data is from the baseband module B of the BBU, to an antenna port E through a transmit and receive channel C of the RRU and a handover switch D of the digital switch. In this process, the baseband module of the BBU sends service data to the antenna corresponding to the sector information.

Refer to FIG. 2, the control module of the BBU may also transmit downlink data with the antenna corresponding to the sector number. An output direction of the downlink data is from the antenna port E to the baseband module B of the BBU through the handover switch D of the digital switch and the transmit and receive channel C of the RRU. In this process, the baseband module of the BBU receives service data received by the antenna corresponding to the sector information.

S303: The digital switch switches from the second switch state to the first switch state based on the first antenna identifier; and the digital switch receives the first antenna identifier sent by the control module of the BBU, where the first antenna identifier may enable the digital switch to switch, within a time unit, to an antenna to which the RRU is to be connected. The digital switch includes at least one handover switch. One or more handover switches in the digital switch from a second switch state to a first switch state based on the first antenna identifier. The first switch state corresponds to a state of a connection between the RRU and the antenna through the handover switch within a first time unit, and the second switch state corresponds to a state of a connection between the RRU and the antenna through the handover switch within a second time unit.

For example, in the first switch state, the RRU is connected to the first antenna through the handover switch within the first time unit, and in the second switch state, the RRU is connected to the second antenna through the handover switch within the second time unit. Specifically, that the digital switch switches from the second switch state to the first switch state based on the first antenna identifier may be understood as that the RRU switches from communicating with the second antenna within the second time unit to communicating with the first antenna within the first time unit. It may be understood that the second time unit is a time unit after the first time unit. For example, the first time unit corresponds to a slotslot 1, and the second time unit corresponds to a slotslot 2.

In an example, the handover switch of the digital switch in the first switch state connects the RRU to the first antenna. In this case, the RRU and the first antenna may be in a communication state. The handover switch of the digital switch in the second switch state connects the RRU to the second antenna. In this case, the RRU and the second antenna may be in a communication state. When the time unit changes from the second time unit to the first time unit, the handover switch in the digital switch also switches from the second switch state to the first switch state. In this case, the RRU switches from communicating with the second antenna to communicating with the first antenna.

In embodiments of this application, the digital switch switches, based on the antenna identifier sent by the baseband unit, the antenna connected to the channel of the remote radio unit RRU to the antenna corresponding to the antenna identifier. In this way, a plurality of antennas may be switched on a channel of a single RRU, so that allocation and multiplexing of RRU device resources in different time units are implemented. In a case of same signal coverage, a quantity of RRU devices is reduced, thereby effectively reducing RRU device costs and improving utilization of RRU device resources.

Figure 4:
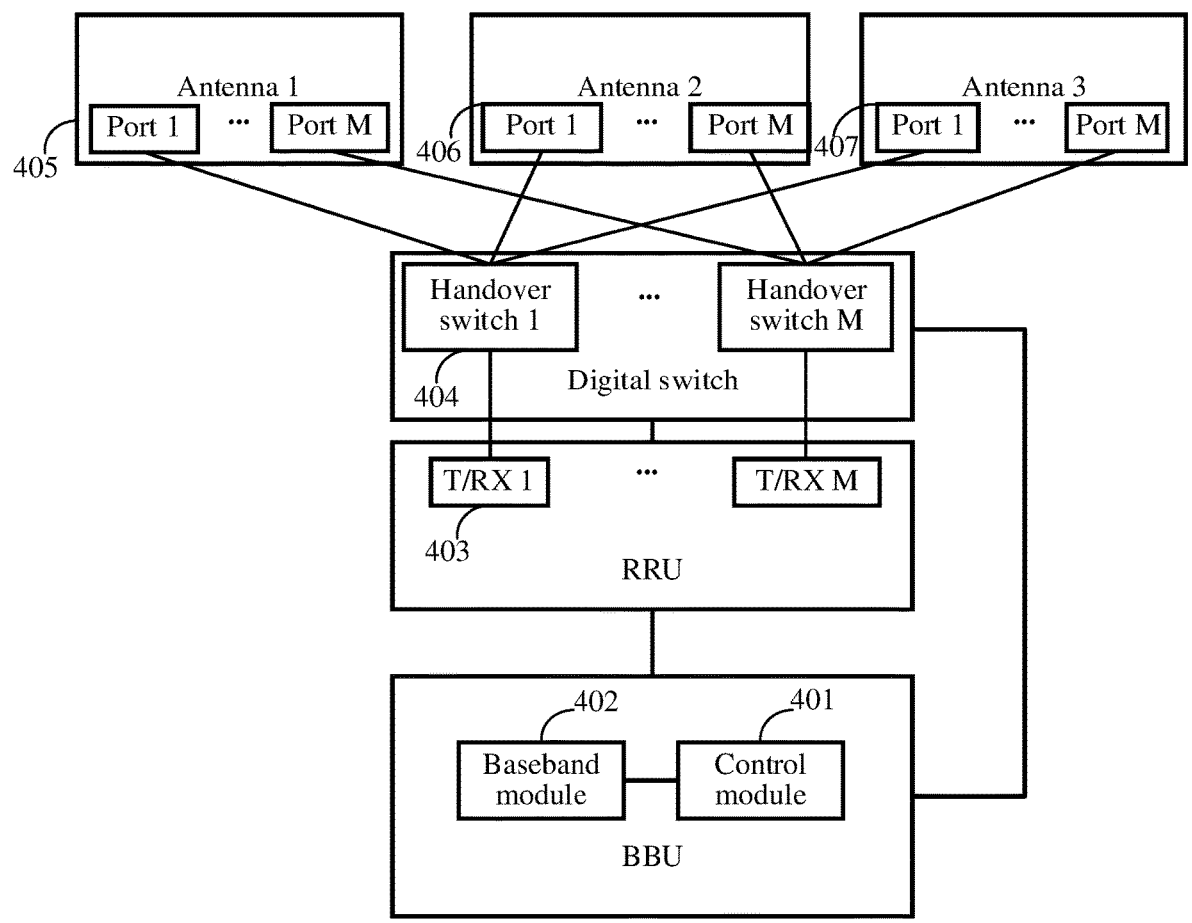
FIG. 4 is a schematic diagram of another base station system according to an embodiment of this application.

It may be understood that the switching method in embodiments of this application may support switching among more than two antennas. A specific switching process is similar to switching between two antennas. Details are not described herein again. Refer to FIG. 4, FIG. 4 is a schematic diagram of a structure of a base station system with three antennas. If the transmission direction of the downlink service data within the second time unit is from a baseband module 402 of the BBU to an antenna port 406, passing through a T/RX 1 channel 403 of the RRU and a handover switch 404, after the handover switch 404 receives the first antenna identifier sent by the BBU, the handover switch 404 switches from the second switch state to the first switch state, within the first time unit, the transmission direction of the downlink service data is from the BBU baseband module 402 to an antenna port 405 through the T/RX 1 channel 403 of the RRU and the handover switch 404.

A time unit in this embodiment of this application includes a symbol, a slot, a sub-frame, a frame, or a transmission time interval TTI. The symbol is a basic time unit for signal modulation in an NR network and an LTE network. In the NR network, the slot is used as a minimum time unit for data scheduling. In the LTE network, the sub-frame is used as a minimum time unit for data scheduling.

This embodiment of this application may be applied to a plurality of wireless mobile networks, including a global system for mobile communications (GSM), a universal mobile telecommunication system (UMTS), a long term evolution (LTE), and a new radio (new radio, NR) network. This is not specifically limited herein.

The following describes an antenna switching method provided in embodiments of this application using a 5th-generation mobile communication (5G) NR network as an example. The method includes the following steps:

Refer to Table 2, Table 2 shows an example of a switching process when a single RRU is connected to two antennas in an NR network system. A scanning period of an SSB in the system is 10 slots. In time units of a slot 0 and a slot 10, each slot is further divided into two parts. If a BBU needs to send service data of an SSB 0 in the first half of a slot, and needs to send service data of an SSB 1 in the second half of a slot, the BBU sends, in the first half of the slot 0, an antenna number 1 corresponding to the SSB 0 to the handover switch in a digital switch, and in the second half of the slot 0, the BBU sends an antenna number 2 corresponding to an SSB 1 to the handover switch in the digital switch. After receiving the corresponding antenna number, the handover switch connects the RRU to an antenna corresponding to the antenna number.

It may be understood that a slot has 14 symbols, and air interface transmission information is not limited to that service data of the SSB 0 is sent on a symbol in the first half of the slot, and service data of the SSB 1 is sent on a symbol in the second half of the slot. The air interface transmission information may alternatively be that service data of the SSB is sent on several specific symbols in a slot, and the handover switch switches to an antenna number corresponding to the SSB in these symbols.

Refer to Table 2, in a slot 1, a slot 5, a slot 18, and a slot 20, if air interface transmission information is service data of a sector 1, the handover switch is connected to the antenna number 1; in a slot 3, a slot 12, and a slot 13, if air interface transmission information is service data of a sector 2, the handover switch is connected to the antenna number 2; and in other slots, if air interface transmission information does not exist, the BBU sends any antenna number to the handover switch from all antenna numbers, the antenna number may be the same as an antenna number in a previous time unit. For example, in a slot 8, an antenna number connected to the handover switch is the same as an antenna number connected to the slot, that is, the antenna number 1.

TABLE 2

| slot number | 0 | 1 | 2 | 3 | 4 | 5 | 6 | 7 | 8 | 9 |
|---|---|---|---|---|---|---|---|---|---|---|
| Air interface transmission information | Data of an SSB 0 | Data of an SSB 1 | Data of a sector 1 | | | Data of a sector 2 | | | Data of the sector 1 | |
| Number of an antenna connected to a handover switch | 1 | 2 | 1 | 2 | 2 | 1 | 1 | 2 | 1 | 1 | 2 |

| slot number | 10 | 11 | 12 | 13 | 14 | 15 | 16 | 17 | 18 | 20 |
|---|---|---|---|---|---|---|---|---|---|---|
| Air interface transmission information | Data of the SSB 0 | Data of the SSB 1 | Data of the sector 2 | Data of the sector 2 | | | | | Data of the sector 1 | Data of the sector 1 |
| Number of the antenna connected to the handover switch | 1 | 2 | 1 | 2 | 2 | 1 | 2 | 1 | 2 | 1 | 1 |

The following describes an antenna switching method provided in embodiments of this application using a 4th-generation mobile communication technology (4G) LTE network as an example. The method includes the following steps:

In embodiments of this application, each antenna in a base station system corresponds to a sector, and a BBU sends, in each sub-frame, an antenna number determined based on air interface transmission information to a handover switch in a digital switch.

Refer to Table 3, Table 3 shows an example of a switching process when a single RRU is connected to two antennas in a 4G LTE network system. In a sub-frame 0, a sub-frame 1, a sub-frame 5, a sub-frame 18, and a sub-frame 20, air interface transmission information is service data of a sector 1, and a handover switch is connected to an antenna number 1. In a sub-frame 3, a sub-frame 10, a sub-frame 12, and a sub-frame 13, air interface transmission information is service data of a sector 2, and a handover switch is connected to an antenna number 2. In another sub-frame, if no air interface transmission information exists, a BBU sends any antenna number to the handover switch from all antenna numbers. The antenna number may be the same as or different from an antenna number in a previous time unit. This is not specifically limited herein.

TABLE 3

| Sub-frame number | 0 | 1 | 2 | 3 | 4 | 5 | 6 | 7 | 8 | 9 |
|---|---|---|---|---|---|---|---|---|---|---|
| Air interface transmission information | Data of a sector 1 | Data of the sector 1 | | Data of a sector 2 | | Data of the sector 1 | | | | |
| Number of an antenna connected to a handover switch | 1 | 1 | 2 | 2 | 1 | 1 | 2 | 1 | 1 | 2 |

| Sub-frame number | 10 | 11 | 12 | 13 | 14 | 15 | 16 | 17 | 18 | 20 |
|---|---|---|---|---|---|---|---|---|---|---|
| Air interface transmission information | Data of the sector 2 | | Data of the sector 2 | Data of the sector 2 | | | | | Data of the sector 1 | Data of the sector 1 |
| Number of the antenna connected to the handover switch | 2 | 1 | 2 | 2 | 1 | 2 | 1 | 2 | 1 | 1 |

In embodiments of this application, the digital switch of the digital switch may be an independent device, or may be used as a module in the RRU, or may be used as a digital switch module in the antenna. This is not specifically limited herein.

Figure 5:
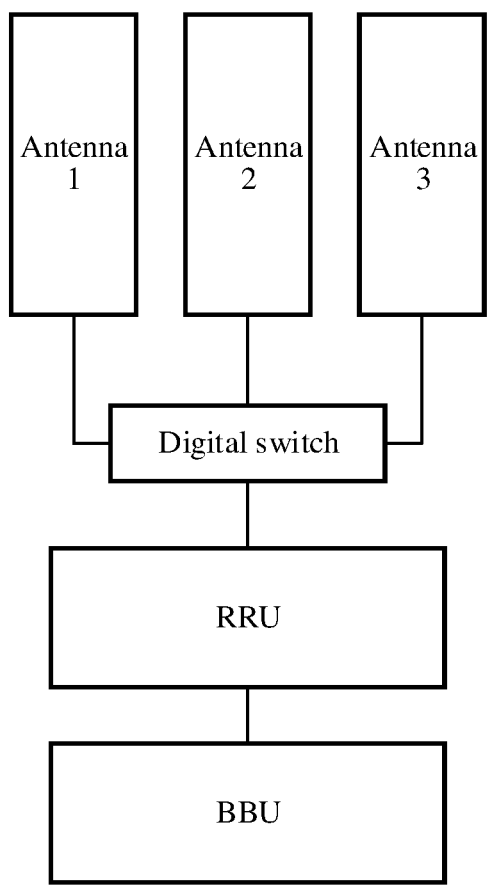
FIG. 5 is a schematic diagram of another base station system according to an embodiment of this application.

Refer to FIG. 5, FIG. 5 is a schematic diagram of an architecture of a base station system, where a digital switch is connected to an RRU, an antenna 1, an antenna 2, and an antenna 3 as an independent device, each transmit and receive channel of the RRU is connected to three antennas through the digital switch device, and the digital switch receives a switching instruction from a BBU, to switch a connection to the RRU among the three antennas.

Figure 6:
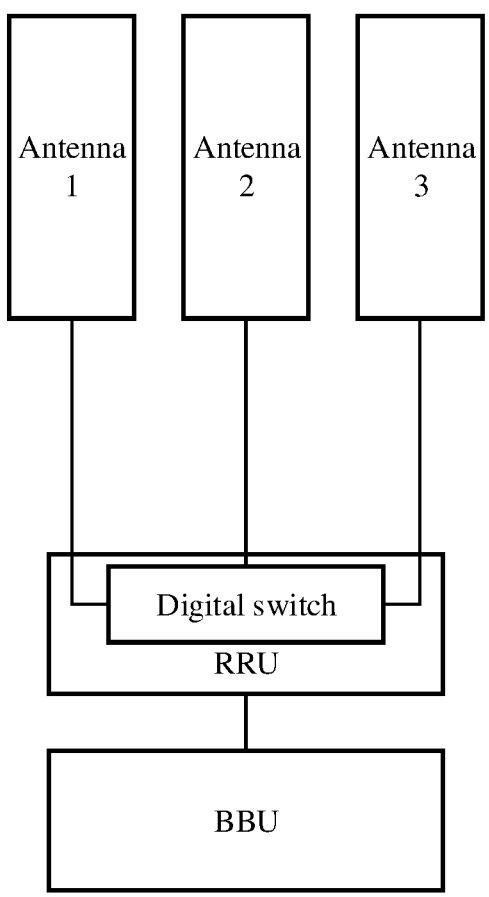
FIG. 6 is a schematic diagram of another base station system according to an embodiment of this application.

Refer to FIG. 6, FIG. 6 is a schematic diagram of an architecture of another base station system, where a digital switch is integrated into an RRU as a module, an antenna 1, an antenna 2, and an antenna 3 are connected to the digital switch in the RRU, and the digital switch in the RRU receives a switching instruction from a BBU, to switch a connection to the RRU among three antennas.

Figure 7:
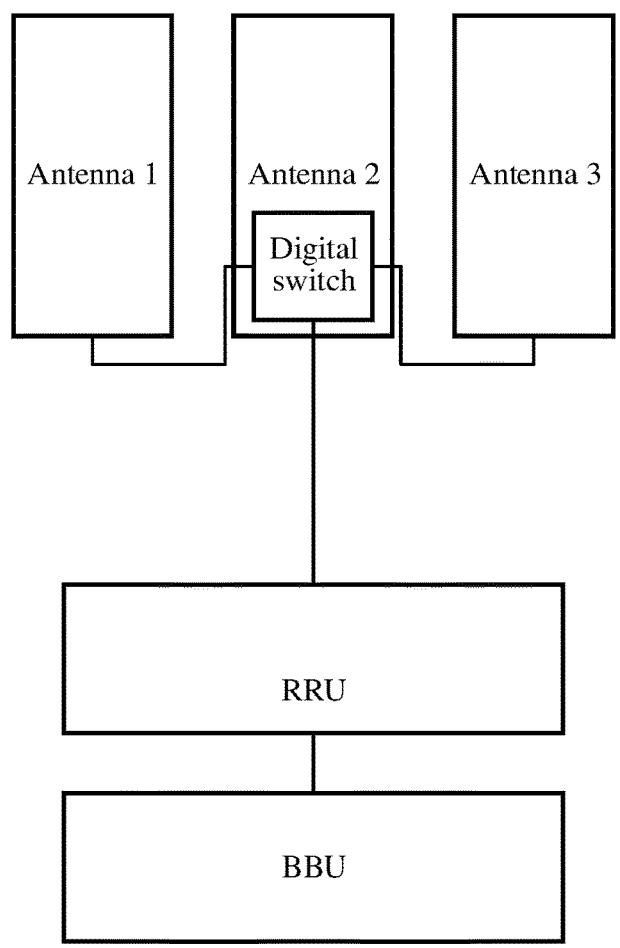
FIG. 7 is a schematic diagram of another base station system according to an embodiment of this application.

Refer to FIG. 7, FIG. 7 is a schematic diagram of an architecture of another base station system. A digital switch is integrated into an antenna as a module, and may be specifically integrated into any antenna of a plurality of antennas of the base station. This is not specifically limited herein.

In FIG. 7, the antenna 1 and an antenna 3 are connected to a digital switch in an antenna 2, and the digital switch in the antenna 2 receives a switching instruction from the BBU, to switch a connection to the RRU among three antennas.

The above describes the antenna switching method in embodiments of this application. The following describes an apparatus in embodiments of this application using a baseband unit BBU as a first communication device, an RRU as a second communication device, and a base station including a BBU, a digital switch, and an RRU as a first network device.

Figure 8:
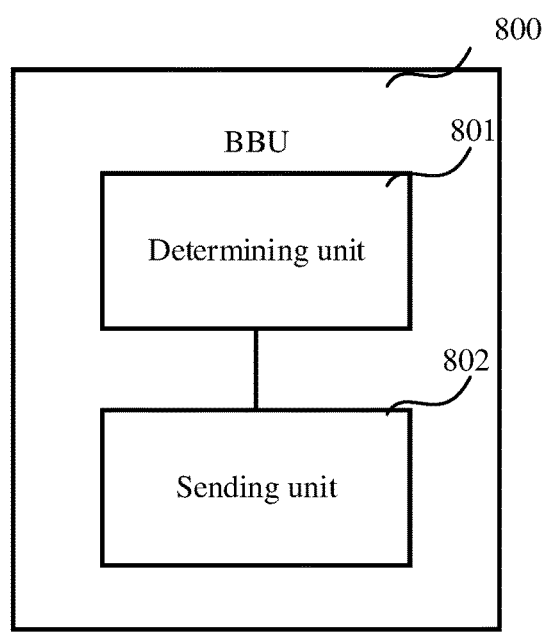
FIG. 8 is a schematic diagram of a structure of a communication device according to an embodiment of this application.

Refer to FIG. 8, FIG. 8 is a schematic diagram of a BBU according to an embodiment of this application. An embodiment of a BBU apparatus according to embodiments of this application includes:

a determining unit 801, configured to determine a first antenna identifier based on air interface transmission information, where the first antenna identifier corresponds to a first switch state, and the first switch state indicates that a remote radio unit RRU communicates with a first antenna within a first time unit; and a sending unit 802, configured to send a first antenna identifier to a digital switch, where the first antenna identifier is used by the digital switch to switch from a second switch state to a first switch state, the second switch state indicates that the RRU communicates with the second antenna within a second time unit, and the first time unit appears after the second time unit.

In some optional embodiments of this application, the determining unit 801 is further configured to:

send sector information corresponding to the first antenna identifier to a baseband module of the BBU; and send service data to an antenna corresponding to the sector information; or receive service data received by an antenna corresponding to the sector information.

In some optional embodiments of this application, the determining unit 801 is further configured to:

form a plurality of sectors in the base station into a cell; and allocate an independent synchronization signal and physical broadcast channel block SSB to each sector in a cell, where each sector corresponds to an antenna number, and the cell includes a sector corresponding to a first antenna and a sector corresponding to a second antenna.

In some optional embodiments of this application, the determining unit 801 is specifically configured to:

when air interface transmission information is service data of the SSB, use an SSB number, a sector number corresponding to the SSB, or an antenna number corresponding to the SSB as the first antenna identifier.

In some optional embodiments of this application, the determining unit 801 is specifically configured to:

if the air interface transmission information is service data of a single sector, use a sector number of the single sector or an antenna number corresponding to the single sector as the first antenna identifier.

In some optional embodiments of this application, the determining unit 801 is specifically configured to:

if the air interface transmission information is service data of a plurality of sectors, determine a sector number based on priorities of the service data of the plurality of sectors; and use the sector number or an antenna number corresponding to the sector number as the first antenna identifier.

In some optional embodiments of this application, the determining unit 801 is specifically configured to:

if no service data exists in the air interface transmission information, use any antenna number in an antenna number set or a sector number corresponding to the antenna number as the first antenna identifier, where the antenna number set includes numbers corresponding to K antennas, and K is an integer greater than or equal to 2.

Figure 9:
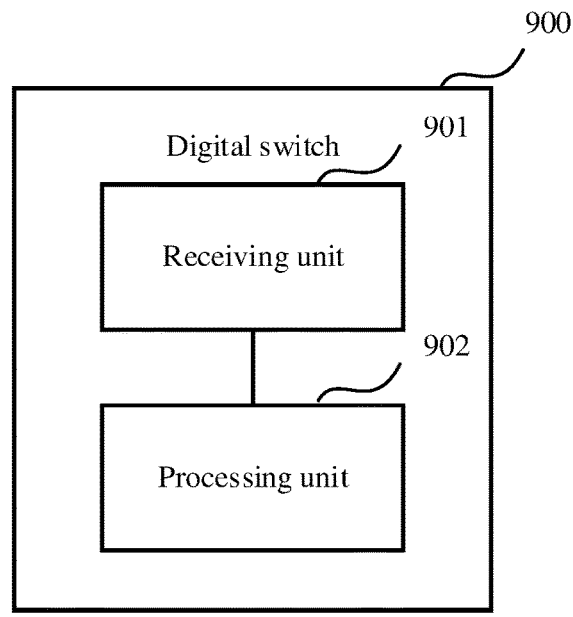
FIG. 9 is a schematic diagram of a structure of another communication device according to an embodiment of this application.

Refer to FIG. 9, FIG. 9 is a schematic diagram of a digital switch according to an embodiment of this application. An embodiment of a BBU apparatus according to an embodiment of this application includes:

a receiving unit 901, configured to receive a first antenna identifier sent by a baseband unit BBU, where the first antenna identifier corresponds to a first switch state, and the first switch state indicates that a remote radio unit RRU communicates with a first antenna within a first time unit; and a processing unit 902, configured to switch from a second switch state to a first switch state based on the first antenna identifier, where the second switch state indicates that the RRU communicates with the second antenna within a second time unit, and the first time unit appears after the second time unit.

In some optional embodiments of this application, the digital switch includes at least one handover switch, and a quantity of handover switches is greater than or equal to a quantity of channels of the RRU.

In some optional embodiments of this application, the receiving unit 901 is specifically configured to receive, through the handover switch, the first antenna identifier sent by the BBU.

In some optional embodiments of this application, the processing unit 902 is specifically configured to switch from the second switch state to the first switch state based on the first antenna identifier through the handover switch.

Figure 10:
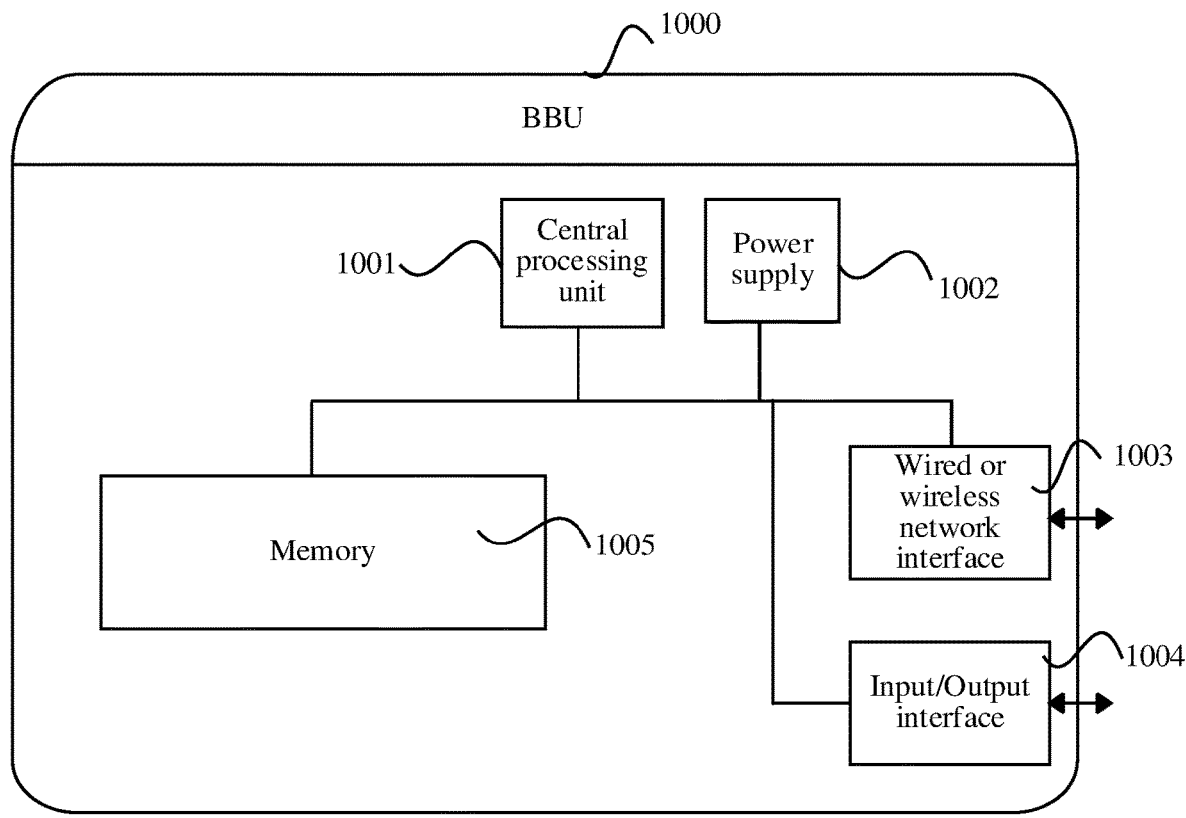
FIG. 10 is a schematic diagram of a structure of another communication device according to an embodiment of this application.

Refer to FIG. 10, FIG. 10 is a schematic diagram of a structure of a BBU according to an embodiment of this application. A BBU 1000 may include one or more central processing units (CPUs) 1001 and a memory 1005. The memory 1005 stores one or more application programs or data.

The memory 1005 may be a volatile memory or a persistent memory. The one or more programs stored in the memory 1005 may include one or more modules, and each module may include a series of instruction operations for a server. Further, the central processing unit 1001 may be configured to communicate with the memory 1005, and perform, on the BBU 1000, a series of instruction operations in the memory 1005.

The BBU 1000 may further include one or more power supplies 1002, one or more wired or wireless network interfaces 1003, one or more input/output interfaces 1004, and/or one or more operating systems, such as Windows Server™, Mac OS X™, Unix™, Linux™, and FreeBSD™.

The BBU 1000 may perform the operations performed by the BBU in the embodiments shown in FIG. 1 to FIG. 7. Details are not described herein again.

Figure 11:
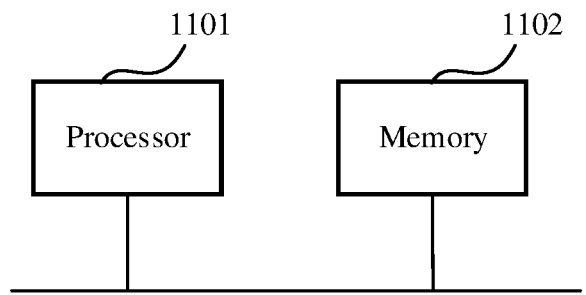
FIG. 11 is a schematic diagram of a structure of another communication device according to an embodiment of this application.

Refer to FIG. 11, FIG. 11 is a possible schematic diagram of a structure of a digital switch. The digital switch includes a processor 1101 and a memory 1102. The processor 1101 and the memory 1102 are connected to each other through a line. The memory 1102 is configured to store program instructions and data. It should be noted that, the processor 1101 is configured to perform an operation of switching a switch state based on an antenna identifier in the step shown in FIG. 3.

Embodiments of this application further provide a digital processing chip. A circuit and one or more interfaces that are configured to implement a function of the processor 1101 are integrated into the digital processing chip. When a memory is integrated into the digital processing chip, the digital processing chip may complete the method steps in any one or more of the foregoing embodiments. When a memory is not integrated into the digital processing chip, the digital processing chip may be connected to an external memory through an interface. The digital processing chip implements, based on program code stored in the external memory, actions performed by an optical transmission device in the foregoing embodiments.

Figure 12:
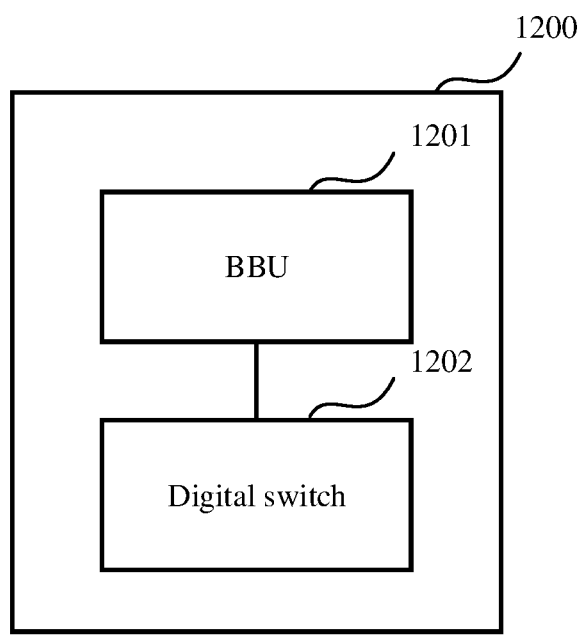
FIG. 12 is a schematic diagram of a structure of a network system according to an embodiment of this application.

Refer to FIG. 12, embodiments of this application provide a network system 1200. The network system 1200 includes a BBU 1201 and a digital switch 1202. Optionally, the BBU 1201 may be a BBU 800 or a BBU 1000, and the digital switch 1202 may be a digital switch 900 or a digital switch 1100.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. An antenna switching method comprising:
    combining a plurality of sectors in a first network device into a cell;
    allocating an independent synchronization signal and physical broadcast channel block (SSB) to each sector in the cell, wherein each sector corresponds to an antenna number, and the cell comprises a sector corresponding to a first antenna and a sector corresponding to a second antenna;
    determining a first antenna identifier based on determining whether air interface transmission information comprises service data of the SSB, wherein the first antenna identifier corresponds to a first switch state, and the first switch state indicates that a second communication device communicates with the first antenna within a first time unit; and
    sending the first antenna identifier to a digital switch, wherein the first antenna identifier indicates the digital switch to switch from a second switch state to the first switch state, the second switch state indicates that the second communication device communicates with the second antenna within a second time unit, and wherein the second communication device is configured to process a signal of a first communication device.

2. The method according to claim 1, wherein after the sending the first antenna identifier to a digital switch, the method further comprises:
    sending, by a controller of the first communication device, sector information corresponding to the first antenna identifier to a baseband processor of the first communication device; and
    communicating, by the baseband processor of the first communication device, service data through an antenna corresponding to the sector information.

3. The method according to claim 1, wherein each of the first time unit and the second time unit is one of a symbol, a slot, a sub-frame, a frame, or a transmission time interval (TTI).

4. The method according to claim 1, wherein
    the determining a first antenna identifier based on determining whether air interface transmission information comprises service data of the SSB comprises:
    in response to determining that the air interface transmission information comprises service data of the SSB, using at least one of an SSB number, an antenna number corresponding to the SSB, or a sector number corresponding to the SSB as the first antenna identifier.

5. The method according to claim 1, wherein the determining a first antenna identifier based on air interface transmission information comprises:
    in response to determining that the air interface transmission information is service data of a single sector, using a sector number of the single sector or an antenna number corresponding to the single sector as the first antenna identifier.

6. The method according to claim 1, wherein the determining the first antenna identifier based on the air interface transmission information within the first time unit comprises:
    in response to determining that the air interface transmission information is service data of a plurality of sectors, determining a sector number based on priorities of the service data of the plurality of sectors; and
    using the sector number or an antenna number corresponding to the sector number as the first antenna identifier.

7. The method according to claim 1, wherein the determining a first antenna identifier based on determining whether air interface transmission information comprises service data of the SSB comprises:
    in response to determining that the air interface transmission information does not comprise service data of the SSB, using an antenna number in an antenna number set or a sector number corresponding to the antenna number as the first antenna identifier, wherein the antenna number set comprises numbers corresponding to K antennas, and K is an integer greater than or equal to 2.

8. A first communication device, comprising:
at least one processor; and
one or more memories coupled to the at least one processor and storing programming instructions for execution by the at least one processor to:
combine a plurality of sectors in a first network device into a cell;
allocate an independent synchronization signal and physical broadcast channel block (SSB) to each sector in the cell, wherein each sector corresponds to an antenna number, and the cell comprises a sector corresponding to a first antenna and a sector corresponding to a second antenna;
determine a first antenna identifier based on determining whether air interface transmission information comprises service data of the SSB, wherein the first antenna identifier corresponds to a first switch state, and the first switch state indicates that a second communication device communicates with the first antenna within a first time unit; and
send the first antenna identifier to a digital switch, wherein the first antenna identifier is used by the digital switch to switch from a second switch state to the first switch state, the second switch state indicates that the second communication device communicates with the second antenna within a second time unit, and wherein the second communication device is configured to process a signal of the first communication device.

9. The first communication device according to claim 8, wherein the programming instructions are for execution by the at least one processor to:
send sector information corresponding to the first antenna identifier to a baseband processor of the first communication device; and
communicate service data through an antenna corresponding to the sector information.

10. The first communication device according to claim 8, wherein
the determine a first antenna identifier based on determining whether air interface transmission information comprises service data of the SSB comprises:
in response to determining that the air interface transmission information comprises service data of the SSB, use an SSB number, a sector number corresponding to the SSB, or an antenna number corresponding to the SSB as the first antenna identifier.

11. The first communication device according to claim 8, wherein the programming instructions are for execution by the at least one processor to:

in response to determining that the air interface transmission information is service data of a single sector, use a sector number of the single sector or an antenna number corresponding to the single sector as the first antenna identifier.

12. The first communication device according to claim 8, wherein the programming instructions are for execution by the at least one processor to:
in response to determining that the air interface transmission information is service data of a plurality of sectors, determine a sector number based on priorities of the service data of the plurality of sectors; and
use the sector number or an antenna number corresponding to the sector number as the first antenna identifier.

13. The first communication device according to claim 8, wherein the determine a first antenna identifier based on determining whether air interface transmission information comprises service data of the SSB comprises:
in response to determining that the air interface transmission information does not comprise service data of the SSB, use an antenna number in an antenna number set or a sector number corresponding to the antenna number as the first antenna identifier, wherein the antenna number set comprises numbers corresponding to K antennas, and K is an integer greater than or equal to 2.

14. The first communication device according to claim 8, wherein each of the first time unit and the second time unit is one of a symbol, a slot, a sub-frame, a frame, or a transmission time interval (TTI).

15. A digital switch, comprising:
a handover switch;
at least one processor; and
one or more memories coupled to the at least one processor and storing programming instructions for execution by the at least one processor to:
receive, through the handover switch, a first antenna identifier sent by a first communication device, wherein the first antenna identifier corresponds to a first switch state, and the first switch state indicates that a second communication device communicates with a first antenna within a first time unit, wherein a quantity of handover switches is greater than or equal to a quantity of channels of the second communication device; and
switch from a second switch state to the first switch state based on the first antenna identifier through the handover switch, wherein the second switch state indicates that the second communication device communicates with a second antenna within a second time unit, and the second communication device is configured to process a signal of the first communication device.

16. The digital switch according to claim 15, wherein each of the first time unit and the second time unit is one of a symbol, a slot, a sub-frame, a frame, or a transmission time interval (TTI).

* * * * *